March 11, 1958  G. B. STILLWAGON, JR  2,826,052
PINNING CONSTRUCTION FOR UNIVERSAL JOINT
Filed Sept. 27, 1955
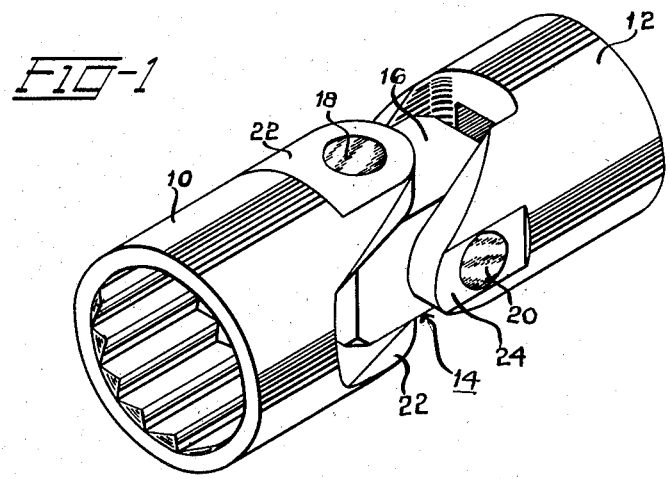
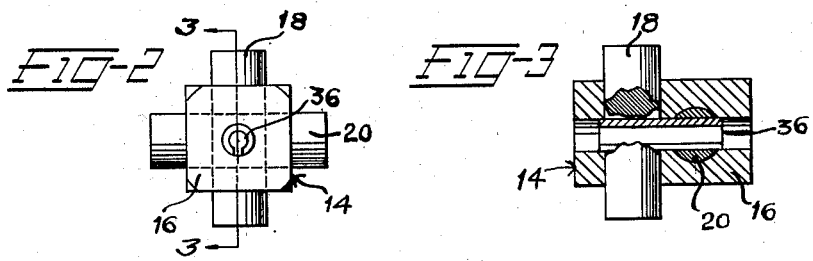
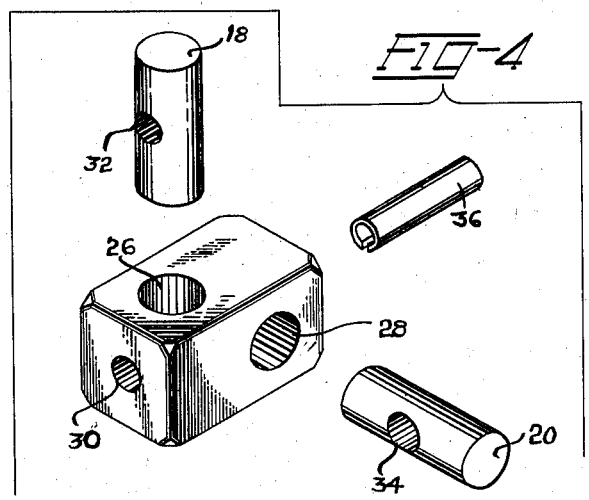
INVENTOR.
GEORGE B. STILLWAGON JR.
BY
HIS ATTORNEYS United States Patent Office 2,826,052
Patented Mar. 11, 1958

2,826,052

PINNING CONSTRUCTION FOR UNIVERSAL JOINT

George B. Stillwagon, Jr., Dayton, Ohio, assignor of one-half to Kenneth G. Fraser, Dayton, Ohio Application September 27, 1955, Serial No. 537,008

5 Claims. (Cl. 64—17)

This invention relates to a pinning construction for universal joints and more particularly to an improvement therein.

One object of this invention is the provision of a pinning construction for universal joints wherein the pins are non-rotatably secured within the coupling block.

Another object of this invention is the provision of a pinning construction which can be readily disassembled for replacement of parts.

A further object of this invention is the provision of a pinning construction having improved strength and resistance to frictional wear.

Other objects and advantages reside in the construction of parts, the combination thereof and the mode of operation, as will become more apparent from the following description.

In the drawing,

Figure 1 is a perspective view of a universal joint.

Figure 2 is a top plan view of the pinning construction of the universal joint.

Figure 3 is a sectional view taken substantially along the line 3—3 of Figure 2 with parts broken away.

Figure 4 is an enlarged exploded view of the pinning construction.

Referring to the drawings in detail, the universal joint of Figure 1 comprises a pair of forked members 10 and 12 coupled together by a pinning construction 14. The pinning construction 14 includes an elongate coupling block 16 which is traversed by a pair of mutually perpendicular and offset pins 18 and 20. The pins 18 and 20 are journalled into complementary bearing portions 22 and 24 integral with the forked members 10 and 12.

The pinning construction is shown in detail in Figures 2, 3 and 4. Traversing adjacent sides of the elongate coupling block 16 are non-intersecting borings 26 and 28 into which the pins 18 and 20 snugly fit. A third boring 30 of smaller diameter extends normally through the ends of the block 16 intersecting the borings 26 and 28, all three borings being mutually perpendicular. The pins 18 and 20 have holes 32 and 34 respectively therein, these holes having the same diameter and being aligned with the boring 30 when the pins 18 and 20 are fitted in the block 16. With the pins 18 and 20 fitted properly in the block 16, a C-shaped (in cross section) self-locking, substantially tubular expansion pin 36 is inserted in the third boring 30, the pin 36 extending through the holes 32 and 34 so as to secure the pins 18 and 20 in the block 16.

One advantage in this construction is that the pinning construction can be disassembled for replacement or repair of damaged parts by merely removing the self-locking pin 36.

Since the pins 18 and 20 need not be worked, that is, bent or swaged, the pins may be made of hardened steel, thereby increasing the strength of the universal joint.

Further advantage to this construction is realized when the forces acting upon the pins are considered. The universal joint is subjected primarily to torsional forces so that the forces exerted upon the pins 18 and 20 will be less at the ends thereof than at the center. As a consequence, the pins 18 and 20 encounter greater frictional wear if they rotate freely within the coupling block 16 than if they are fixed within the block 16 and rotated freely in the bearing portions 22 and 24. It is thus an advantage to have the pins 18 and 20 non-rotatably secured to the block 16.

The construction of the C-shaped expansion pin 36 is relatively unimportant, since there are no significant forces exerted upon that pin. The pin 36 may be formed by rolling or convoluting a rectangular sheet of spring metal into an elongate tubular pin having a diameter slightly greater than that of the boring 30. The pin 36, upon being contracted in diameter for insertion into the boring 30, expands in the boring 30 to frictionally engage the interior surface of the coupling block 16 adjacent the boring 30, thereby locking itself within the coupling block. By way of illustration, the pin 36 has been shown as having a C-shape cross section; however, any other suitably shaped self-locking pin may be used.

In some applications of this pinning construction, the design of the forked members 10 and 12, which are coupled together, may be such that the ends of the coupling block 16 are obstructed, thus preventing entire removal of the self-locking pin 36. It is apparent, however, that either of the pins 18 and 20 may be removed from the coupling block 16 by moving the self-locking pin 36 so that it extends only half-way through the coupling block. Thus it is not necessary to entirely remove the pin 36 in order to disassemble the universal joint. The clearance required at either end of the coupling block 16 for disassembly of the universal joint is kept to a minimum by making the self-locking pin 36 as short as possible. The pin 36 is made just long enough to extend entirely through both the pins 18 and 20.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A pinning construction for a universal joint, comprising a block having a first pair of borings of equal diameter, there being one of said borings extending normally through each pair of opposite sides of the block, a first pair of pins, there being one pin projected into each of said borings, said pins having a diameter substantially equal to that of the borings, said pins having end portions extending outside the block, said block having a third boring therein, said third boring intersecting each of said first pair of borings, said first pair of pins having portions cut out, said cut out portions being in alignment with said third boring, and pin means projected through the third boring and through the cut out portions in the first pair of pins so as to retain said first pair of pins in the block.

2. A pinning construction according to claim 1 wherein the pin means is a self-locking expansion pin having a length sufficient to traverse simultaneously each of the first pair of borings, said expansion pin comprising a sheet of spring metal rolled to provide an elongate tubular pin having a diameter slightly greater than that of said third boring which pin upon being contracted in diameter for insertion into said third boring expands to frictionally engage said coupling block so as to lock itself therein.

3. A pinning construction for a universal joint comprising a block having a first pair of borings of equal diameter, there being one of said borings extending normally through each pair of opposite sides of the block, the borings being disposed toward opposite ends of the block so as not to intersect, said block having a third boring of smaller diameter extending centrally and normally through the ends thereof, said third boring intersecting each of the first pair of borings, the three borings being mutually perpendicular, a pair of pins, there being one pin projected into each of said first pair of borings, the pins having substantially the same diameter as the first pair of borings and being of such a length that the end portions thereof extend outside the block, each of said pins having a hole therein in substantial alignment with the third boring, said holes having substantially the same diameter as the third boring, and removable self-locking pin means projected into the third boring and through the holes in the first pair of pins to retain these pins in the block.

4. A pinning construction according to claim 3 wherein the pin means is a self-locking tubular expansion pin comprising a sheet of spring metal rolled to provide an elongate tubular member having a C-shaped cross-section and having sufficient length to traverse simultaneously each of the first pair of borings.

5. In a pinning construction for a universal joint comprising a coupling block having a first pair of off-set normally oriented borings therein, said borings being of equal diameter, and a pair of first pins, there being one pin journalled in each of said borings and fitting snugly therein, said first pins having a length greater than the length of said block such that the opposite ends of said pins project outwardly from said block, the improvement comprising a self-locking expansion pin for securing said first pins within said block, said block having a third boring therein intersecting each of said first pair of borings, said first pins having cut out portions therein aligned with said third boring whereby said expansion pin may be inserted into said third boring and projected through the cut out portions of said first pins to thereby secure said first pins within said coupling block, said expansion pin including a spring metal sheet rolled to provide an elongate tubular pin having a diameter slightly larger than that of said third boring, said expansion pin upon being contracted in diameter for insertion into said third boring expanding in diameter in said third boring to frictionally engage the interior surface of said coupling block adjacent said third boring so as to lock itself therein.

References Cited in the file of this patent
UNITED STATES PATENTS

| | | |
|---|---|---|
| 1,267,852 | Curtis | May 28, 1918 |
| 1,271,615 | Ranger | July 9, 1918 |
| 2,196,297 | Gagne | Apr. 9, 1940 |
| 2,636,759 | Rueb | Apr. 28, 1953 |